US012450183B2

United States Patent
Ahmad Shahir Bin Ahmad Nor et al.

(10) Patent No.: US 12,450,183 B2
(45) Date of Patent: Oct. 21, 2025

(54) ELECTRONIC DEVICE

(71) Applicant: Sharp Semiconductor Innovation Corporation, Tenri (JP)

(72) Inventors: Ahmad Shahir Bin Ahmad Nor, Tenri (JP); Takahiro Inoue, Tenri (JP); Tetsuro Ikeda, Tenri (JP); Isamu Kawabe, Tenri (JP)

(73) Assignee: Sharp Semiconductor Innovation Corporation, Tenri (JP)

( * ) Notice: Subject to any disclaimer, the term of this patent is extended or adjusted under 35 U.S.C. 154(b) by 6 days.

(21) Appl. No.: 18/444,334

(22) Filed: Feb. 16, 2024

(65) Prior Publication Data
US 2024/0281391 A1  Aug. 22, 2024

(30) Foreign Application Priority Data

Feb. 21, 2023 (JP) .................... 2023-025167

(51) Int. Cl.
*G06F 13/24* (2006.01)
*G06F 13/42* (2006.01)

(52) U.S. Cl.
CPC .......... *G06F 13/24* (2013.01); *G06F 13/4282* (2013.01)

(58) Field of Classification Search
CPC ............. G06F 11/2247; G06F 11/2205; G06F 11/2263; G06F 13/24; G06F 13/4282
See application file for complete search history.

(56) References Cited

U.S. PATENT DOCUMENTS

| | | | |
|---|---|---|---|
| 10,282,329 B2* | 5/2019 | Sakuma | G06F 13/4282 |
| 11,119,966 B2* | 9/2021 | Mishra | G06F 13/4295 |
| 11,928,065 B2* | 3/2024 | Teferi | G06F 13/362 |
| 2011/0113171 A1* | 5/2011 | Radhakrishnan | G06F 13/4291 710/110 |
| 2014/0337553 A1* | 11/2014 | Du | G06F 13/24 710/267 |
| 2015/0058507 A1 | 2/2015 | Sengoku et al. | |
| 2017/0083467 A1* | 3/2017 | Mishra | G06F 13/4282 |
| 2020/0073833 A1* | 3/2020 | Graif | G06F 13/24 |
| 2020/0409881 A1* | 12/2020 | Foust | G06F 13/24 |
| 2021/0216490 A1* | 7/2021 | Kumar | G06F 13/4282 |

FOREIGN PATENT DOCUMENTS

JP  2016-532967 A  10/2016

* cited by examiner

*Primary Examiner* — Henry Tsai
*Assistant Examiner* — Christopher A Daley
(74) *Attorney, Agent, or Firm* — ScienBiziP, P.C.

(57) ABSTRACT

An electronic device includes: a master, and a plurality of slaves to which a plurality of mutually different identifiers is assigned respectively, wherein each slave of the plurality of slaves transmits, to the master, a first signal representing a bit sequence containing a bit representing whether or not an interrupt is occurring in that slave and changes a position of the bit based on the identifier assigned to the slave.

12 Claims, 14 Drawing Sheets

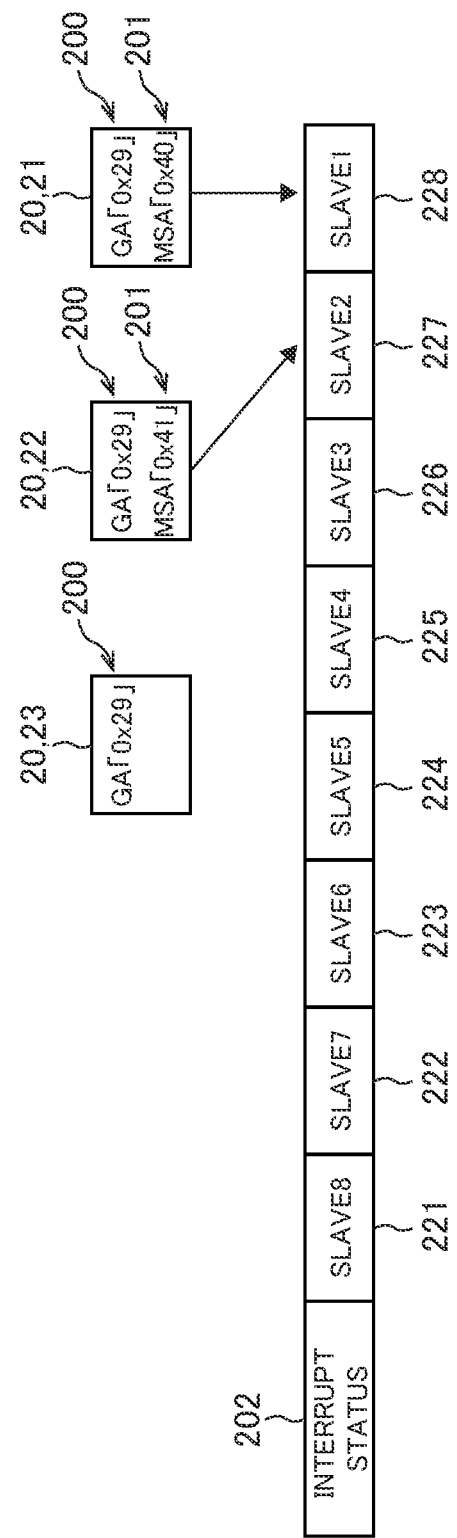

FIG. 6

| MSA | VALUE OF INTERRUPT STATUS WHEN NO INTERRUPT IS OCCURRING | VALUE OF INTERRUPT STATUS WHEN AN INTERRUPT IS OCCURRING |
|---|---|---|
| 0x40 | 11111110 — 228 | 11111110 — 228 |
| 0x41 | 11111101 — 227 | 11111101 — 227 |
| 0x42 | 11111011 — 226 | 11111011 — 226 |
| 0x43 | 11110111 — 225 | 11110111 — 225 |
| 0x44 | 11101111 — 224 | 11101111 — 224 |
| 0x45 | 11011111 — 223 | 11011111 — 223 |
| 0x46 | 10111111 — 222 | 10111111 — 222 |
| 0x47 | 01111111 — 221 | 01111111 — 221 |

↑ 201  ↑ 202  ↑ 202

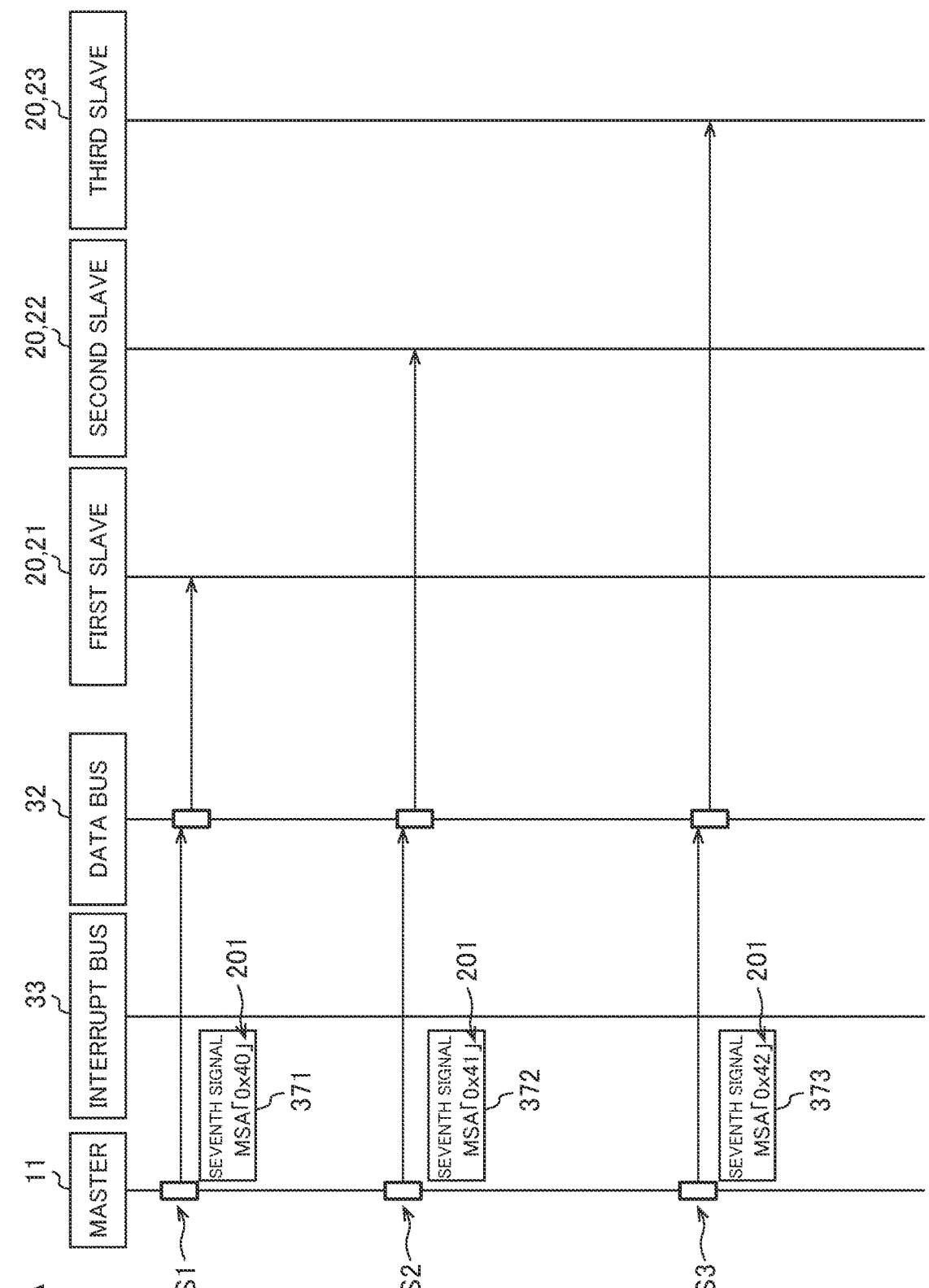

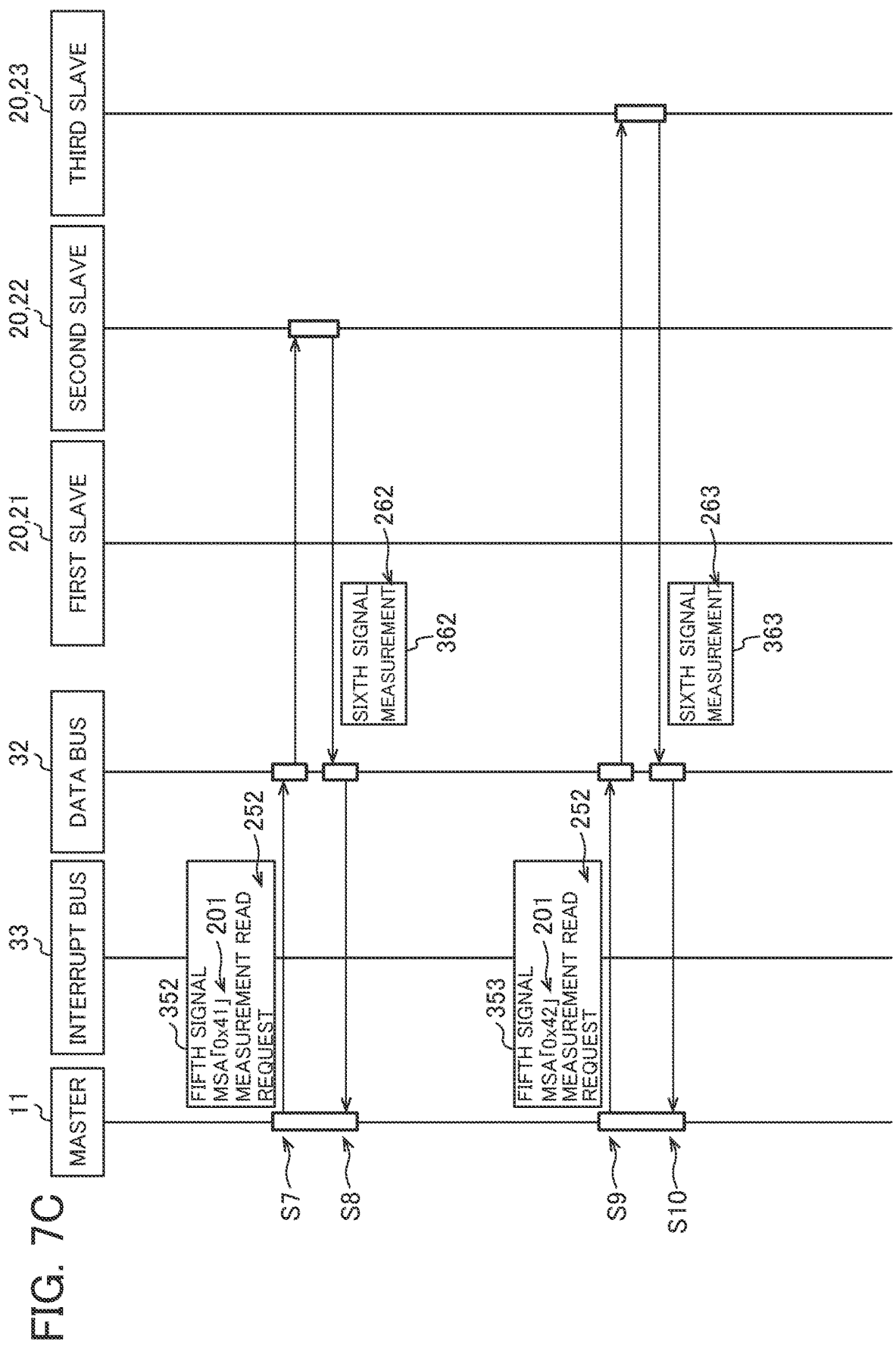

ELECTRONIC DEVICE

TECHNICAL FIELD

The present disclosure relates to electronic devices. The present application claims the benefit of priority to Japanese Patent Application No. 2023-025167 filed on Feb. 21, 2023, the entire contents of which are incorporated herein by reference.

BACKGROUND

Published Japanese Translation of PCT Application No. 2016-532967 discloses a device. In this device, an IRQ bus is coupled to a plurality of slave devices and a master device. Each slave device asserts an interrupt request by driving the IRQ bus for a period of time having a length corresponding to the identification information of the slave device. Each slave device generates a pulse having a width specified for the group to which the slave device belongs. Slave devices with a higher priority are assigned longer pulse widths. Slave device with a lower priority are assigned shorter pulse widths. The master device uses the duration of the assertion of the IRQ bus to identify the highest priority group that includes the asserting slave device. The master device scans the IRQ status register on the slave device to which the pulse width observed on the IRQ bus is assigned (paragraphs 0034, 0035, and 0036).

SUMMARY

In the device disclosed in Published Japanese Translation of PCT Application No. 2016-532967, it can be ascertained that a slave device belonging to a group to which a pulse width less than or equal to the duration of the assertion of the IRQ bus is assigned is asserting an interrupt request. However, the slave devices belonging to the group must be scanned to ascertain whether each slave device is asserting an interrupt request. Therefore, it takes a long time to identify the slave device that has asserted the interrupt request.

The present disclosure, in an aspect thereof, has been made in view of this problem.

The present disclosure, in an aspect thereof, has an object to, for example, provide an electronic device capable of quickly identifying the slave in which an interrupt is occurring.

The present disclosure, in an aspect thereof, is directed to an electronic device including: a master; and a plurality of slaves to which a plurality of mutually different identifiers are assigned respectively, wherein each slave of the plurality of slaves transmits, to the master, a first signal representing a bit sequence containing a bit representing whether or not an interrupt is occurring in that slave and changes a position of the bit based on the identifier assigned to the slave.

BRIEF DESCRIPTION OF DRAWINGS

FIG. 5C is a diagram of an interrupt status obtained using an encoder included in the electronic device in accordance with Embodiment 1.

FIG. 6 is a table showing a relationship between the multi-slave address (MSA) assigned to a slave included in the electronic device in accordance with Embodiment 1, the value of the interrupt status when no interrupt is occurring in the slave, and the value of the interrupt status when an interrupt is occurring in the slave.

FIG. 7A is a sequence diagram representing a flow of communications performed between a master and a plurality of slaves included in the electronic device in accordance with Embodiment 1.

FIG. 7C is a sequence diagram representing a flow of communications performed between a master and a plurality of slaves included in the electronic device in accordance with Embodiment 1.

DESCRIPTION OF EMBODIMENTS

Figure 1:
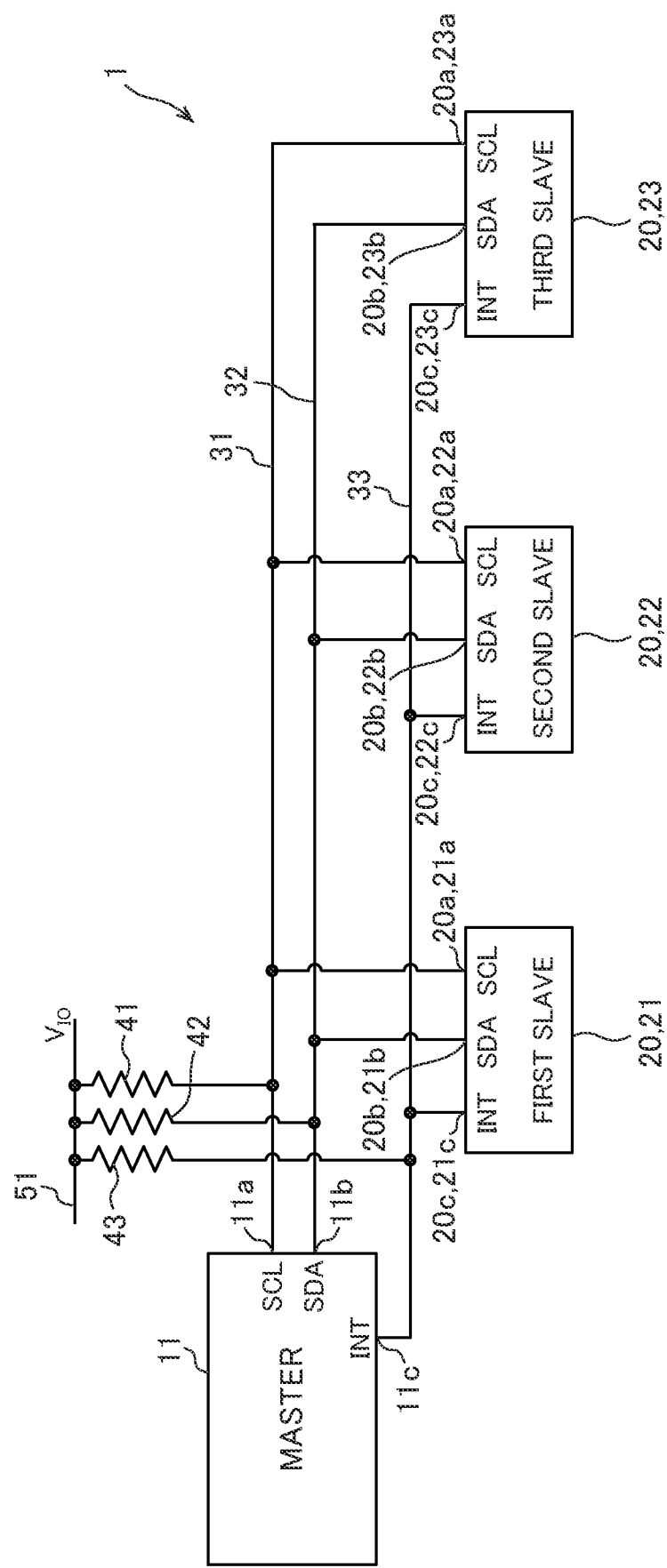
FIG. 1 is a block diagram of an electronic device in accordance with Embodiment 1.

The following will describe an embodiment of the present disclosure with reference to drawings. Note that identical and equivalent elements in the drawings are denoted by the same reference numerals, and description thereof is not repeated.

1 Embodiment 1

1.1 Identifying Slave in which Interrupt is Occurring

If the master has a plurality of interrupt terminals, and a plurality of lines respectively connect a plurality of slaves to the plurality of interrupt terminals of the master, the master can, upon an input of an interrupt signal, ascertain that an interrupt is occurring in the slave connected to the interrupt terminal to which the interrupt signal has been inputted. However, in such a case, the number of lines grows with an increase in the number of slaves. Therefore, the lines occupy an increasingly large area with an increase in the number of slaves.

If the master has a shared single interrupt terminal for a plurality of slaves, and the lines connect the plurality of slaves to the interrupt terminal of the master, the master cannot identify the slave in which an interrupt is occurring, upon an input of an interrupt signal. Therefore, the master checks each slave as to whether or not an interrupt is occurring therein. This technique is called a polling technique. In this case, however, as the number of slaves increases, more time is needed to check each slave as to whether or not an interrupt is occurring therein.

In view of these issues, Embodiment 1 provides an electronic device that, even when there is an increase in the number of slaves, requires no additional area for accommodating the lines and no additional time to check as to whether or not an interrupt is occurring therein.

1.2 Electronic Device

FIG. 1 is a block diagram of an electronic device in accordance with Embodiment 1.

An electronic device 1 in accordance with Embodiment 1 shown in FIG. 1 is a robot cleaner. The electronic device 1 surveys its surroundings and cleans the surroundings based on the conditions obtained in the survey. The electronic device 1 may be any electronic device other than a robot cleaner.

Referring to FIG. 1, the electronic device 1 includes a master 11, a plurality of slaves 21, 22, and 23, a clock bus 31, a data bus 32, an interrupt bus 33, a pull-up resistor 41, a pull-up resistor 42, a pull-up resistor 43, and a power supply line 51. The master 11 has a first clock (SCL) terminal 11a, a first data (SDA) terminal 11b, and a first interrupt terminal (INT) 11c. The plurality of slaves 21, 22, and 23 have a plurality of second clock (SCL) terminals 21a, 22a, and 23a respectively, a plurality of second data (SDA) terminals 21b, 22b, and 23b respectively, and a plurality of second interrupt (INT) terminals 21c, 22c, and 23c respectively. In Embodiment 1, the plurality of slaves 21, 22, and 23 are three slaves. The number of slaves included in the electronic device may be increased or decreased. The number of slaves included in the electronic device may be increased within the capability of the clock bus 31 and the data bus 32.

The master 11 and the plurality of slaves 21, 22, and 23 are electronic circuits. Electronic circuits include, for example, integrated circuits and discrete circuits. The clock bus 31, the data bus 32, and the interrupt bus 33 are wiring. Wiring includes, for example, patterns and electrical wires included in a printed board.

The first clock terminal 11a and the second clock terminals 21a, 22a, and 23a are electrically connected to the common clock bus 31. Hence, the clock bus 31 electrically connects the second clock terminals 21a, 22a, and 23a to the first clock terminal 11a.

The first data terminal 11b and the second data terminals 21b, 22b, and 23b are electrically connected to the common data bus 32. Hence, the data bus 32 electrically connects the second data terminals 21b, 22b, and 23b to the first data terminal 11b.

The first interrupt terminal 11c and the second interrupt terminals 21c, 22c, and 23c are electrically connected to the common interrupt bus 33. Hence, the interrupt bus 33 electrically connects the second interrupt terminals 21c, 22c, and 23c to the first interrupt terminal 11c.

The pull-up resistor 41 is connected at an end thereof to the clock bus 31. The pull-up resistor 41 is connected at the other end thereof to the power supply line 51. The pull-up resistor 42 is connected at an end thereof to the data bus 32. The pull-up resistor 42 is connected at the other end thereof to the power supply line 51. The pull-up resistor 43 is connected at an end thereof to the interrupt bus 33. The pull-up resistor 43 is connected at the other end thereof to the power supply line 51. Hence, the clock bus 31, the data bus 32, and the interrupt bus 33 are pulled up by the power supply line 51. The power supply line 51 is provided with a power supply potential $V_{IO}$. Hence, the clock bus 31, the data bus 32, and the interrupt bus 33 are provided with potential High (H) corresponding to the power supply potential $V_{IO}$.

The master 11 transmits a clock signal from the first clock terminal 11a. The clock bus 31 transfers the transmitted clock signal from the first clock terminal 11a to the second clock terminals 21a, 22a, and 23a. The slaves 21, 22, and 23 receive the transferred clock signal at the second clock terminals 21a, 22a, and 23a respectively. Hence, the master 11 transmits the clock signal to the slaves 21, 22, and 23.

The master 11 transmits a data signal from the first data terminal 11b. The data bus 32 transfers the transmitted data signal from the first data terminal 11b to the second data terminals 21b, 22b, and 23b. The slaves 21, 22, and 23 receive the transferred data signal at the second data terminals 21b, 22b, and 23b respectively. Hence, the master 11 transmits the data signal to the slaves 21, 22, and 23. The master 11 transmits the data signal in synchronism with the clock signal transmitted from the first clock terminal 11a. The slaves 21, 22, and 23 receive the data signal in synchronism with the clock signal received at the second clock terminals 21a, 22a, and 23a respectively.

Each slave 21, 22, and 23 include a slave 20 that transmits a data signal from a second data terminal 20b of the slave 20. The data bus 32 transfers the transmitted data signal from the second data terminal 20b to the first data terminal 11b. The master 11 receives the transferred data signal at the first data terminal 11b. Hence, the slave 20 transmits the data signal to the master 11. The slave 20 transmits the data signal in synchronism with the clock signal received at a second clock terminal 20a of the slave 20. The master 11 receives the data signal in synchronism with the clock signal transmitted from the first clock terminal 11a.

Each slave 20 transmits an interrupt signal from a second interrupt terminal 20c of the slave 20. The interrupt bus 33 transfers the transmitted interrupt signal from the second interrupt terminal 20c to the first interrupt terminal 11c. The master 11 receives the transferred interrupt signal at the first interrupt terminal 11c. Hence, the slave 20 transmits the interrupt signal to the master 11.

The clock bus 31 and the data bus 32 are serial buses. Therefore, the clock bus 31 is a serial clock bus. The data bus 32 is a serial data bus. The first clock terminal 11a and the second clock terminals 21a, 22a, and 23a are serial clock terminals. The first data terminal 11b and the second data terminals 21b, 22b, and 23b are serial data terminals. The serial buses are I²C buses.

Each slave 20 is a device that operates in serial communications and outputs an interrupt signal for completion of an operation. In Embodiment 1, each slave 20 is a sensor for measuring and hence acquiring a measurement. Each slave 20 may be a device other than a sensor.

One of the slaves 21, 22, and 23 that has acquired a measurement to be transmitted to the master 11 (hereinafter, the "interrupt slave") transmits an interrupt signal to the master 11. The master 11, upon receiving the transmitted interrupt signal, transmits a signal representing a measurement read request to the interrupt slave. The interrupt slave transmits a signal representing the measurement to the master 11 in response to the reception of the signal representing the transmitted measurement read request. The master 11 receives the transmitted signal representing the measurement. The master 11 or a controller connected in a communicable manner to the master 11 uses the measurement represented by the received signal to control the electronic device 1. For example, each slave 20 is a time of flight (TOF) sensor for measuring a distance to acquire a measurement of the distance. In addition, the master 11 or the controller uses the measurement of the distance to control automatic travel in robot cleaning.

The master 11 cannot identify the interrupt slave that has transmitted an interrupt signal from the received interrupt signal. Therefore, the electronic device 1 is equipped with a function of having the master 11 identify the interrupt slave after the master 11 has received the interrupt signal.

The slaves 21, 22, and 23 have a common address. A common address is alternatively referred to as a global address (GA). The plurality of slaves 21, 22 and 23 have a plurality of unique addresses that are mutually different. The plurality of unique addresses are alternatively referred to as multi-slave addresses (MSAs). The plurality of MSAs are identifiers for identifying the plurality of slaves 21, 22 and 23 from each other. In Embodiment 1, the plurality of MSAs are assigned by the master 11. In some cases, the master 11 does not assign MSAs to the plurality of slaves 21, 22 and 23. For example, in a device in which the plurality of slaves 21, 22 and 23 are already identifiable, the master 11 does not assign MSAs to the plurality of slaves 21, 22 and 23.

By transmitting a data signal representing an address and a read request, the master 11 can cause the slave having this address to transmit a data signal representing a bit sequence. In addition, the master 11 can receive the transmitted data signal representing a bit sequence. The master 11 can cause the slaves 21, 22, and 23 to transmit the data signal representing a bit sequence, by specifying the address as being a GA. By specifying the address as being an MSA, the master 11 can cause one of the slaves 21, 22, and 23 that is assigned an MSA that matches this MSA to transmit the data signal representing a bit sequence.

By transmitting a data signal representing an address and a write request and subsequently transmitting a data signal representing a bit sequence, the master 11 can cause the slave having this address to receive the data signal representing a bit sequence. The master 11 can cause the slaves 21, 22, and 23 to receive the data signal representing a bit sequence, by specifying the address as being a GA. By specifying the address as being an MSA, the master 11 can cause one of the slaves 21, 22, and 23 that has an MSA that matches this MSA to receive the data signal representing a bit sequence.

1.3 Master

Figure 2:
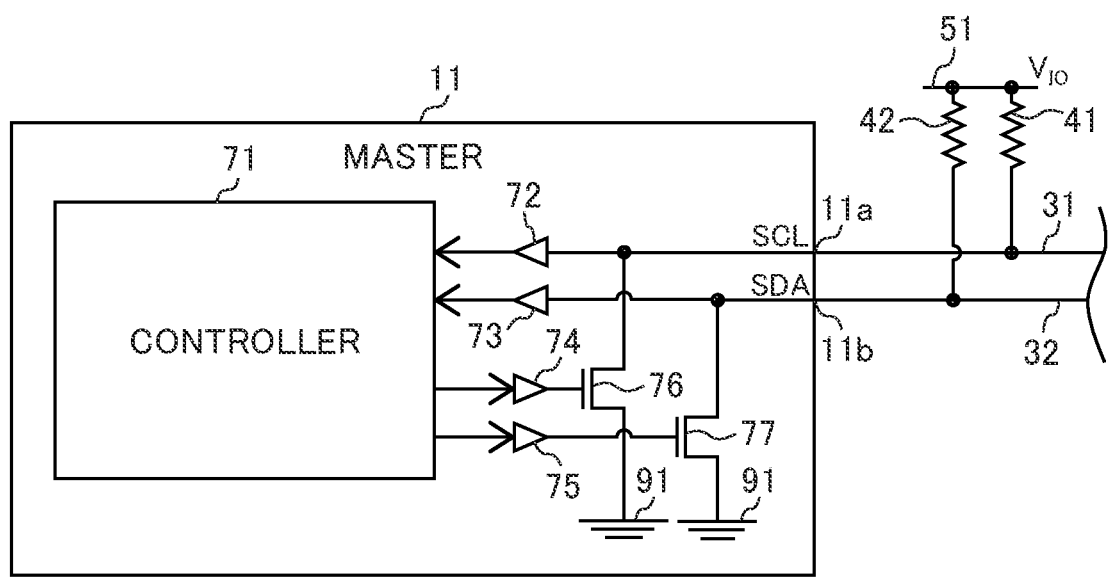
FIG. 2 is a block diagram of the electronic device in accordance with Embodiment 1, showing a vicinity of a master included in the electronic device.

FIG. 2 is a block diagram of the electronic device in accordance with Embodiment 1, showing a vicinity of a master included in the electronic device.

Referring to FIG. 2, the master 11 includes a controller 71, a buffer 72, a buffer 73, a buffer 74, a buffer 75, a pull-down transistor 76, and a pull-down transistor 77.

The first clock terminal 11a is electrically connected to the input terminal of the buffer 72. The output terminal of the buffer 72 is electrically connected to the controller 71. Hence, the controller 71 is inputted with the clock signal transmitted from the first clock terminal 11a via the buffer 72.

The first data terminal 11b is electrically connected to the input terminal of the buffer 73. The output terminal of the buffer 73 is electrically connected to the controller 71. Hence, the controller 71 is inputted with either the data signal transmitted from the first data terminal 11b or the data signal received at the first data terminal 11b, both via the buffer 73.

The controller 71 is electrically connected to the input terminal of the buffer 74. The output terminal of the buffer 74 is electrically connected to the gate of the pull-down transistor 76. The drain of the pull-down transistor 76 is electrically connected to the first clock terminal 11a. The source of the pull-down transistor 76 is electrically connected to ground 91. Ground 91 is at ground potential. When the pull-down transistor 76 is provided with ON potential H at the gate thereof, the pull-down transistor 76 electrically connects the drain thereof to the source thereof, thereby pulling down the first clock terminal 11a to ground 91 and hence applying potential Low (L) corresponding to the ground potential to the first clock terminal 11a. When the pull-down transistor 76 is provided with OFF potential L at the gate thereof, the pull-down transistor 76 does not electrically connect the drain thereof to the source thereof and applies potential H to the first clock terminal 11a. The controller 71 applies either ON potential H or OFF potential L to the gate of the pull-down transistor 76 via the buffer 74. Hence, the controller 71 causes the master 11 to transmit a clock signal from the first clock terminal 11a.

The controller 71 is electrically connected to the input terminal of the buffer 75. The output terminal of the buffer 75 is electrically connected to the gate of the pull-down transistor 77. The drain of the pull-down transistor 77 is electrically connected to the first data terminal 11b. The source of the pull-down transistor 77 is electrically connected to ground 91. When the pull-down transistor 77 is provided with ON potential H at the gate thereof, the pull-down transistor 77 electrically connects the drain thereof to the source thereof, thereby pulling down the first data terminal 11b to ground 91 and hence applying potential L to the first data terminal 11b. When the pull-down transistor 77 is provided with OFF potential L at the gate thereof, the pull-down transistor 77 does not electrically connect the drain thereof to the source thereof and applies potential H to the first data terminal 11b. The controller 71 applies either ON potential H or OFF potential L to the gate of the pull-down transistor 77 via the buffer 75. Hence, the controller 71 causes the master 11 to transmit a data signal from the first data terminal 11b.

1.4 Slave

Figure 3:
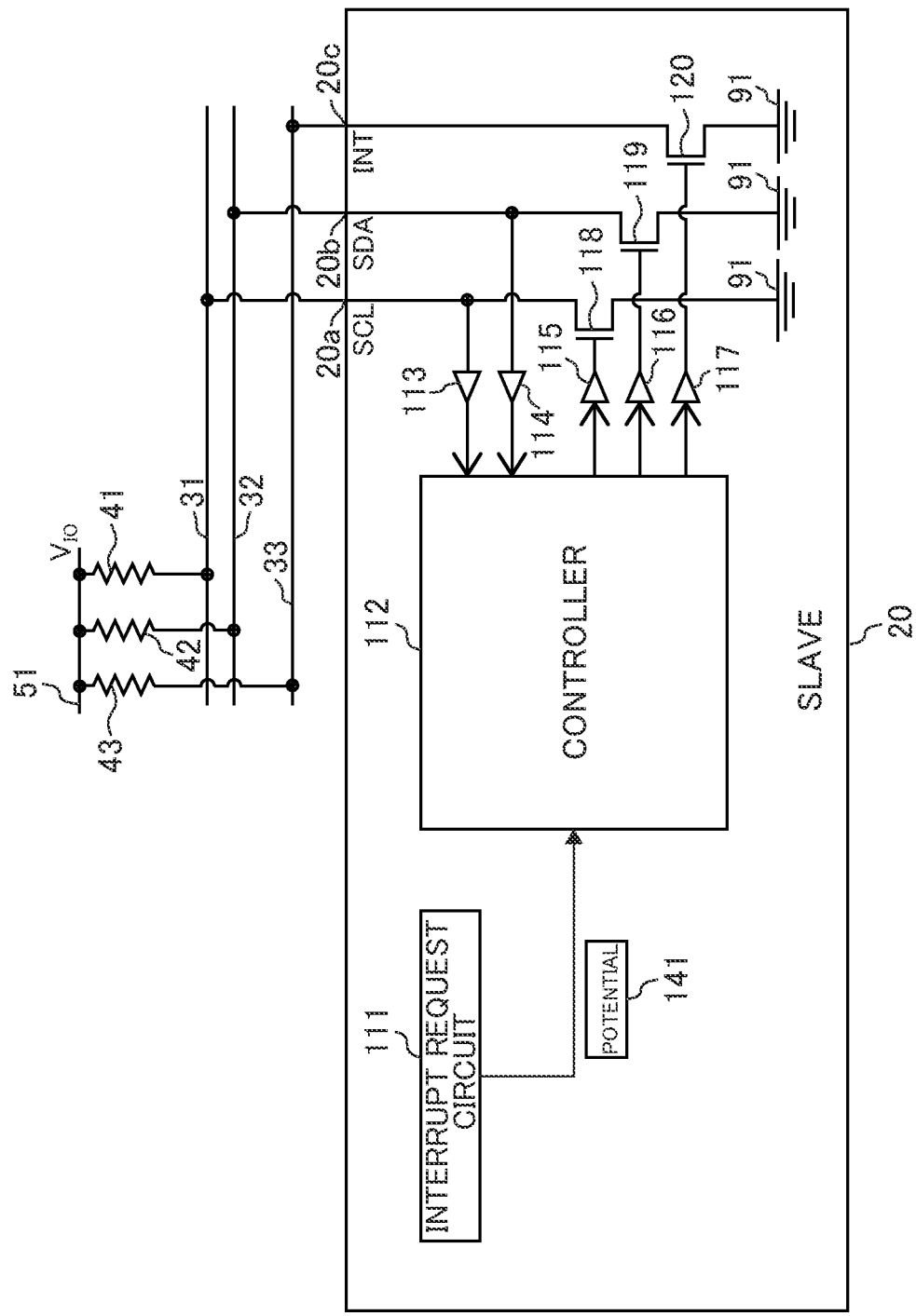
FIG. 3 is a block diagram of the electronic device in accordance with Embodiment 1, showing a vicinity of each slave included in the electronic device.

FIG. 3 is a block diagram of the electronic device in accordance with Embodiment 1, showing a vicinity of each slave included in the electronic device.

Referring to FIG. 3, each slave 20 includes an interrupt request circuit 111, a controller 112, a buffer 113, a buffer 114, a buffer 115, a buffer 116, a buffer 117, a pull-down transistor 118, a pull-down transistor 119, and a pull-down transistor 120.

Upon a measurement to be transmitted to the master 11 being acquired, the interrupt request circuit 111 requests an interrupt. The interrupt request circuit 111 provides, to the controller 112, an electrical potential 141 representing whether or not to request an interrupt. The interrupt request circuit 111 specifies the electrical potential 141 to potential H to request an interrupt. The interrupt request circuit 111 specifies the electrical potential 141 to potential L to not request an interrupt.

The second clock terminal 20a of each slave 20 is electrically connected to the input terminal of the buffer 113. The output terminal of the buffer 113 is electrically connected to the controller 112. Hence, the controller 112 is inputted with the clock signal received at the second clock terminal 20a via the buffer 113.

The second data terminal 20b of each slave 20 is electrically connected to the input terminal of the buffer 114. The output terminal of the buffer 114 is electrically connected to the controller 112. Hence, the controller 112 is inputted with either the data signal transmitted from the second data terminal 20b or the data signal received at the second data terminal 20b, both via the buffer 114.

The controller 112 is electrically connected to the input terminal of the buffer 115. The output terminal of the buffer 115 is electrically connected to the gate of the pull-down transistor 118. The drain of the pull-down transistor 118 is electrically connected to the second clock terminal 20a. The source of the pull-down transistor 118 is electrically connected to ground 91. When the pull-down transistor 118 is provided with ON potential H at the gate thereof, the pull-down transistor 118 electrically connects the drain thereof to the source thereof, thereby pulling down the second clock terminal 20a to ground 91 and hence applying potential L to the second clock terminal 20a. When the pull-down transistor 118 is provided with OFF potential L at the gate thereof, the pull-down transistor 118 does not electrically connect the drain thereof to the source thereof and applies potential H to the second clock terminal 20a. The controller 112 applies either ON potential H or OFF potential L to the gate of the pull-down transistor 118 via the buffer 115.

The controller 112 is electrically connected to the input terminal of the buffer 116. The output terminal of the buffer 116 is electrically connected to the gate of the pull-down transistor 119. The drain of the pull-down transistor 119 is electrically connected to the second data terminal 20b. The source of the pull-down transistor 119 is electrically connected to ground 91. When the pull-down transistor 119 is provided with ON potential H at the gate thereof, the pull-down transistor 119 electrically connects the drain thereof to the source thereof, thereby pulling down the second data terminal 20b to ground 91 and hence applying potential L to the second data terminal 20b. When the pull-down transistor 119 is provided with OFF potential L at the gate thereof, the pull-down transistor 119 does not electrically connect the drain thereof to the source thereof and applies potential H to the second data terminal 20b. The controller 112 applies either ON potential H or OFF potential L to the gate of the pull-down transistor 119 via the buffer 116. Hence, the controller 112 causes each slave 20 to transmit a data signal from the second data terminal 20b.

The controller 112 is electrically connected to the input terminal of the buffer 117. The output terminal of the buffer 117 is electrically connected to the gate of the pull-down transistor 120. The drain of the pull-down transistor 120 is electrically connected to the second interrupt terminal 20c of each slave 20. The source of the pull-down transistor 120 is electrically connected to ground 91. When the pull-down transistor 120 is provided with ON potential H at the gate thereof, the pull-down transistor 120 electrically connects the drain thereof to the source thereof, thereby pulling down the second interrupt terminal 20c to ground 91 and hence applying potential L to the second interrupt terminal 20c. When the pull-down transistor 120 is provided with OFF potential L at the gate thereof, the pull-down transistor 120 does not electrically connect the drain thereof to the source thereof and applies potential H to the second interrupt terminal 20c. The controller 112 applies either ON potential H or OFF potential L to the gate of the pull-down transistor 120 via the buffer 117. Hence, the controller 112 causes each slave 20 to transmit an interrupt signal from the second interrupt terminal 20c. The controller 112 applies the electrical potential provided by the interrupt request circuit 111 to the gate of the pull-down transistor 120. Therefore, when an interrupt is occurring, the second interrupt terminal 20c is provided with potential L. When an interrupt is not occurring, the second interrupt terminal 20c is provided with potential H. Potential L and potential H indicate a logic 1 and a logic 0. A logic 1 and a logic 0 are inverse to each other. Therefore, the logic value represented by the electrical potential provided by the second interrupt terminal 20c is inverse to the logic value represented by the electrical potential provided by the interrupt request circuit 111.

Hence, the second clock terminal 20a can be used for both input and output. In addition, the second data terminal 20b can be used for both input and output. In addition, the second interrupt terminal 20c can be used for output.

The second data terminals 21b, 22b, and 23b are open drain outputs. The second data terminals 21b, 22b, and 23b are connected to the common data bus 32. Therefore, the data bus 32 wired-ORs the second data terminals 21b, 22b, and 23b together. Therefore, when any of the second data terminals 21b, 22b, and 23b is provided with potential L, the first data terminal 11b and the second data terminals 21b, 22b, and 23b are all provided with potential L. This also holds true when the second data terminals 21b, 22b, and 23b are open collector outputs.

The second interrupt terminals 21c, 22c, and 23c are open drain outputs. The second interrupt terminals 21c, 22c, and 23c are connected to the common interrupt bus 33. Therefore, the interrupt bus 33 wired-ORs the second interrupt terminals 21c, 22c, and 23c together. Therefore, when any of the second interrupt terminals 21c, 22c, and 23c is provided with potential L, the first interrupt terminal 11c and the second interrupt terminals 21c, 22c, and 23c are all provided with potential L. This also holds true when the second interrupt terminals 21c, 22c, and 23c are open collector.

1.5 Slave Controller

Figure 4:
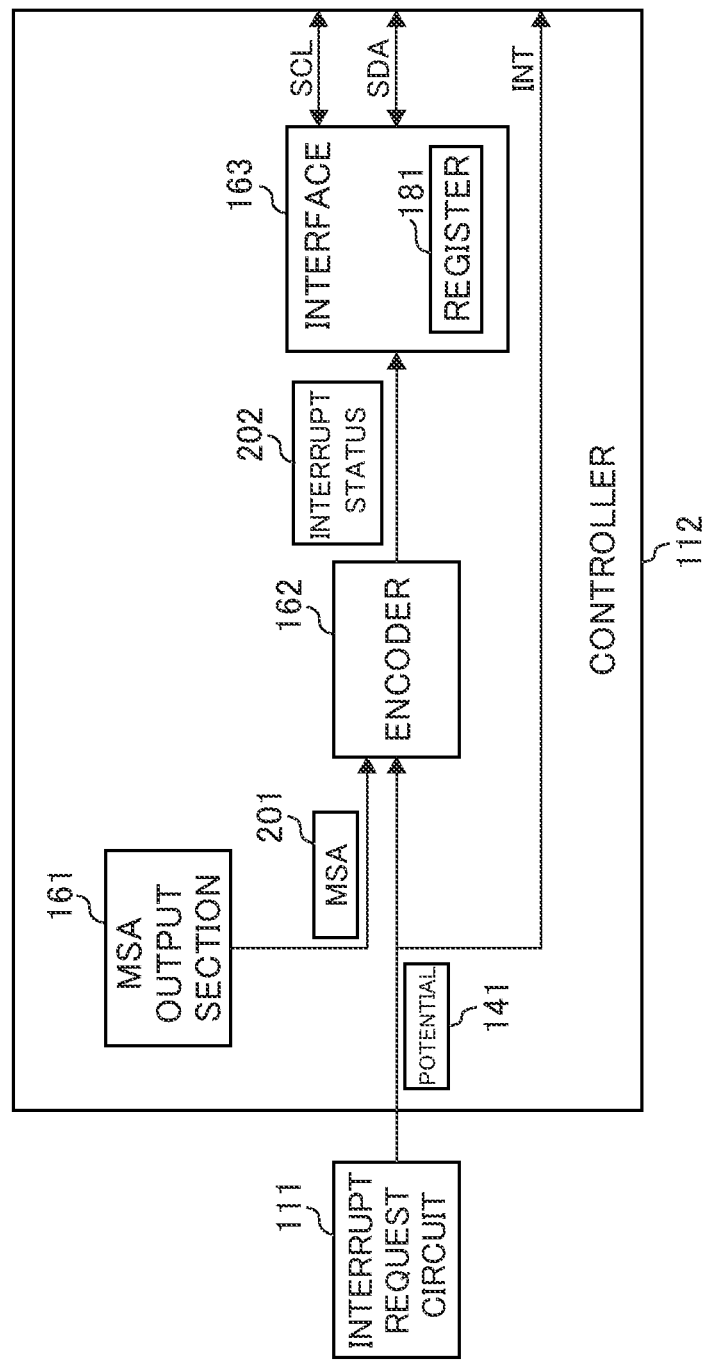
FIG. 4 is a block diagram of an interrupt request circuit and a controller included in each slave included in the electronic device in accordance with Embodiment 1.

FIG. 4 is a block diagram of an interrupt request circuit and a controller included in each slave included in the electronic device in accordance with Embodiment 1.

Referring to FIG. 4, the controller 112 included in each slave 20 includes an MSA output section 161, an encoder 162, and an interface 163. The interface 163 includes a register 181.

The MSA output section 161 outputs an MSA 201 for each slave 20. The MSA 201 for each slave 20, differing from the MSA for the other slaves, is a unique identifier for each slave 20. The outputted MSA 201 is a bit sequence containing a plurality of bits. In Embodiment 1, the plurality of bits are 8 bits. The MSA output section 161, which outputs the MSA 201, is an example of an identifier output section that outputs a unique identifier to each slave 20. Therefore, the controller 112 may include an identifier output section that outputs an identifier other than the MSA 201, in place of the MSA output section 161. The identifier other than the MSA 201 may be, for example, a value stored in a one-time programmable (OTP) memory included in each slave 20 or a value representing the electrical potential provided to a terminal of each slave 20. It should be understood however that the MSA 201 can be efficiently assigned than the identifier other than the MSA 201, which simplifies the circuitry of the electronic device 1.

The encoder 162 encodes the provided electrical potential 141 into an interrupt status 202 in accordance with the outputted MSA 201. The interrupt status 202 obtained by the encoding is a bit sequence containing a plurality of bits. In Embodiment 1, the plurality of bits are 8 bits. The interrupt status 202 contains a bit representing whether or not an interrupt is occurring in each slave 20. The value of this bit is inverse of the value representing the electrical potential 141 provided by the interrupt request circuit 111. Therefore, the bit having a value of 0 indicates that an interrupt is occurring. The bit having a value of 1 indicates that an interrupt is not occurring. The encoder 162 change, on the basis of the MSA 201, the position of the bit representing whether or not an interrupt is occurring. Hence, the interrupt slave in which an interrupt is occurring can be identified by using the position. The encoder 162 changes the position on the basis of at least one of the plurality of bits contained in the MSA 201. For example, the encoder 162 changes the position on the basis of the lowest 3 bits contained in the plurality of bits. Hence, the electrical potential 141 can be efficiently encoded, which simplifies the circuitry of the electronic device 1. The encoder 162 sets the interrupt status 202 in the register 181.

The interface 163 is electrically connected to the buffers 113, 114, 115 and 116. The interface 163 causes each slave 20 to transmit a data signal representing the interrupt status 202 set in the register 181 from the second data terminal 20b, in response to reception of the data signal representing the GA of each slave 20 and a read request at the second data terminal 20b. The interface 163 is an I²C interface.

1.6 Interrupt Status

FIGS. 5A to 5D are diagrams of an interrupt status obtained using an encoder included in the electronic device in accordance with Embodiment 1.

As shown in FIGS. 5A to 5D, the interrupt status 202 includes a first bit 221, a second bit 222, a third bit 223, a fourth bit 224, a fifth bit 225, a sixth bit 226, a seventh bit 227, and an eighth bit 228. The first bit 221, the second bit 222, the third bit 223, the fourth bit 224, the fifth bit 225, the sixth bit 226, the seventh bit 227, and the eighth bit 228 are arranged from the higher bit to the lower bit as in the stated order. The encoder 162 shifts the bit representing whether or not an interrupt is occurring in each slave 20 from the eighth bit 228, which is the least significant bit, to a higher bit the number of times that matches the value of the lowest 3 bits of the MSA 201 included in each slave 20. Hence, the encoder 162 changes the position on the basis of the value. The position may be changed on the basis of the value by another method.

Each slave 20, if not assigned an MSA 201 by the master 11, has MSA [00h]. Therefore, even if each slave 20 is not assigned an MSA 201 by the master 11, when the encoder 162 encodes the electrical potential 141 into the interrupt status 202 in accordance with the MSA 201, the eighth bit 228, which corresponds to the value of the lowest 3 bits, "0x0," of MSA [00h], represents, in the interrupt statuses 202 obtained by the first slave 21, the second slave 22, and the third slave 23, whether or not an interrupt is occurring in the first slave 21, the second slave 22, and the third slave 23. For example, referring to FIG. 5A, when the first slave 21, the second slave 22, and the third slave 23 have a GA200 (GA "0x29"), but the first slave 21, the second slave 22, and the third slave 23 are not assigned an MSA 201, the common, eighth bit 228 represents, in the interrupt statuses 202 obtained by the first slave 21, the second slave 22, and the third slave 23, whether or not an interrupt is occurring in the first slave 21, the second slave 22, and the third slave 23. Meanwhile, if the master 11 has not assigned an MSA 201 to each slave 20, when the encoder 162 does not encode the electrical potential 141 into the interrupt status 202, the interrupt statuses 202 obtained by the first slave 21, the second slave 22, and the third slave 23 does not contain a bit representing whether or not an interrupt is occurring in the first slave 21, the second slave 22, and the third slave 23.

Figure 5A:
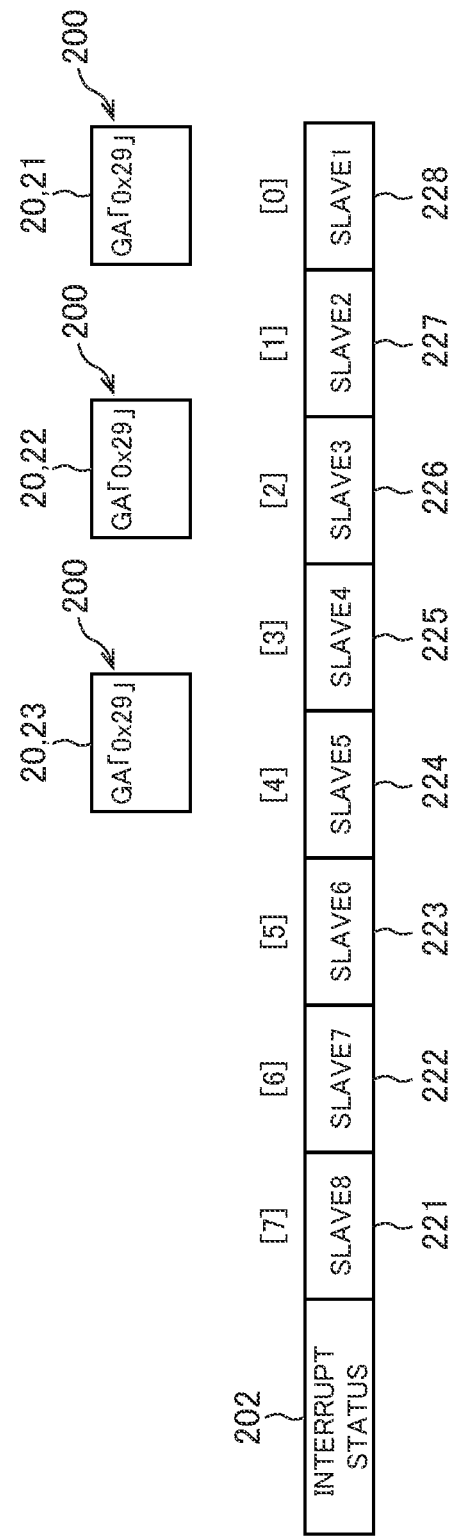
FIG. 5A is a diagram of an interrupt status obtained using an encoder included in the electronic device in accordance with Embodiment 1.
Figure 5B:
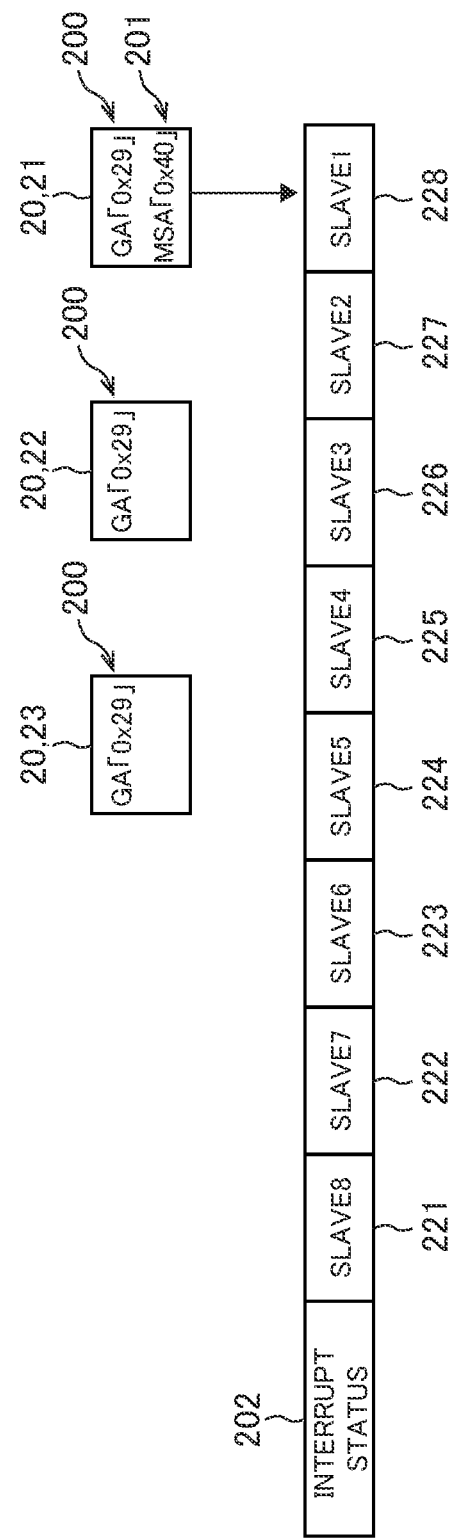
FIG. 5B is a diagram of an interrupt status obtained using an encoder included in the electronic device in accordance with Embodiment 1.

Referring to FIG. 5B, when the first slave 21 is assigned the MSA 201 (MSA "0x40"), the encoder 162 included in the first slave 21 shifts the bit representing whether or not an interrupt is occurring in the first slave 21 from the eighth bit 228, which is the least significant bit, to a higher bit 0 times, which is the number of times that matches the value of the lowest 3 bits ("0x0") of MSA "0x40" assigned to the first slave 21. In other words, the bit is not shifted from the least significant, eighth bit 228. Therefore, in the interrupt status 202 obtained by the first slave 21, the least significant, eighth bit 228 represents whether or not an interrupt is occurring in the first slave 21.

Referring to FIG. 5C, when the second slave 22 is assigned another MSA 201 (MSA "0x41"), the encoder 162 included in the second slave 22 shifts the bit representing whether or not an interrupt is occurring in the second slave 22 from the eighth bit 228, which is the least significant bit, to a higher bit 1 times, which is the number of times that matches the value of the lowest 3 bits ("0x1") of MSA "0x41" assigned to the second slave 22. Therefore, in the interrupt status 202 obtained by the second slave 22, the seventh bit 227, which is one bit higher than the least significant, eighth bit 228, represents whether or not an interrupt is occurring in the second slave 22.

Figure 5D:
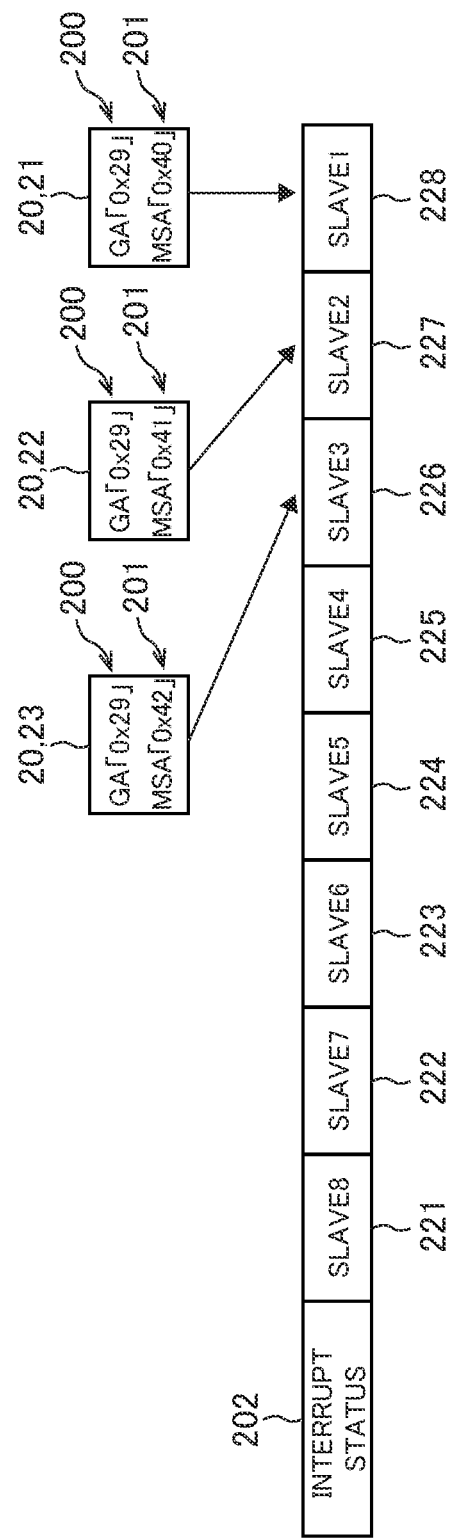
FIG. 5D is a diagram of an interrupt status obtained using an encoder included in the electronic device in accordance with Embodiment 1.

Referring to FIG. 5D, when the third slave 23 is assigned another MSA 201 (MSA "0x42"), the encoder 162 included in the third slave 23 shifts the bit representing whether or not an interrupt is occurring in the third slave 23 from the eighth bit 228, which is the least significant bit, to a higher bit 2 times, which is the number of times that matches the value of the lowest 3 bits ("0x2") of MSA "0x42" assigned to the third slave 23. Therefore, in the interrupt status 202 obtained by the third slave 23, the sixth bit 226, which is two bits higher than the least significant, eighth bit 228, represents whether or not an interrupt is occurring in the third slave 23.

Referring to FIGS. 5B to 5D, the positions of the eighth bit 228, the seventh bit 227, and the sixth bit 226 representing whether or not an interrupt is occurring in the first slave 21, the second slave 22, and the third slave 23 respectively differ from each other. Therefore, it can be determined, from the interrupt statuses 202 obtained by the first slave 21, the second slave 22, and the third slave 23, whether or not an interrupt is occurring in the first slave 21, the second slave 22, and the third slave 23 respectively. This holds true also when the interrupt statuses 202 obtained by the first slave 21, the second slave 22, and the third slave 23 are implemented with OR logic. The master 11, by using this, determines whether or not an interrupt is occurring in the first slave 21, the second slave 22, and the third slave 23.

The number of slaves in which the master 11 can determine whether or not an interrupt is occurring in response to a single read request varies depending on the number of bits of communications performed between the master 11 and each slave 20. For example, when the number of bits of communications performed between the master 11 and each slave 20 is 8 bits, the number of slaves in which the master 11 can determine whether or not an interrupt is occurring is eight.

1.7 Value of Interrupt Status

FIG. 6 is a table showing a relationship between the MSA assigned to a slave included in the electronic device in accordance with Embodiment 1, the value of the interrupt status when no interrupt is occurring in the slave, and the value of the interrupt status when an interrupt is occurring in the slave.

As described above, the bit contained in the interrupt status 202 obtained by each slave 20 to represent whether or not an interrupt is occurring is shifted from the eighth bit 228, which is the least significant bit, to a higher bit only the number of times that matches the value of the lowest 3 bits of the MSA 201 assigned to that slave 20. Therefore, as shown in FIG. 6, when the MSA 201 assigned to each slave 20 is "0x40," "0x41," "0x42," "0x43," "0x44," "0x45," "0x46," and "0x47," the bit representing whether or not an interrupt is occurring in each slave 20 is the eighth bit 228, the seventh bit 227, the sixth bit 226, the fifth bit 225, the fourth bit 224, the third bit 223, the second bit 222, and the first bit 221 respectively. Hence, the eighth bit 228, the seventh bit 227, the sixth bit 226, the fifth bit 225, the fourth bit 224, the third bit 223, the second bit 222, and the first bit 221 are associated with MSAs "0x40," "0x41," "0x42," "0x43," "0x44," "0x45," "0x46," and "0x47" respectively.

When an interrupt is occurring in each slave 20, the bit contained in the interrupt status 202 obtained by each slave 20 to represent whether or not an interrupt is occurring has a value "0." This bit has a value "1" when no interrupt is occurring in each slave 20. The bit other than the bit contained in the interrupt status 202 obtained by each slave 20 has a value "1."

Therefore, when no interrupt is occurring in each slave 20, all the 8 bits contained in the interrupt status 202 obtained by each slave 20 has a value "1." When an interrupt is occurring in each slave 20, one of the 8 bits has a value "0," whereas 7 bits of the 8 bits have a value "1." Therefore, whether or not an interrupt is occurring can be determined from the presence/absence of a bit having a value "0." In addition, the interrupt slave in which an interrupt is occurring can be determined from the position of the bit having a value "0."

1.8 Communications Performed Between Master and Plurality of Slaves

Figure 7B:
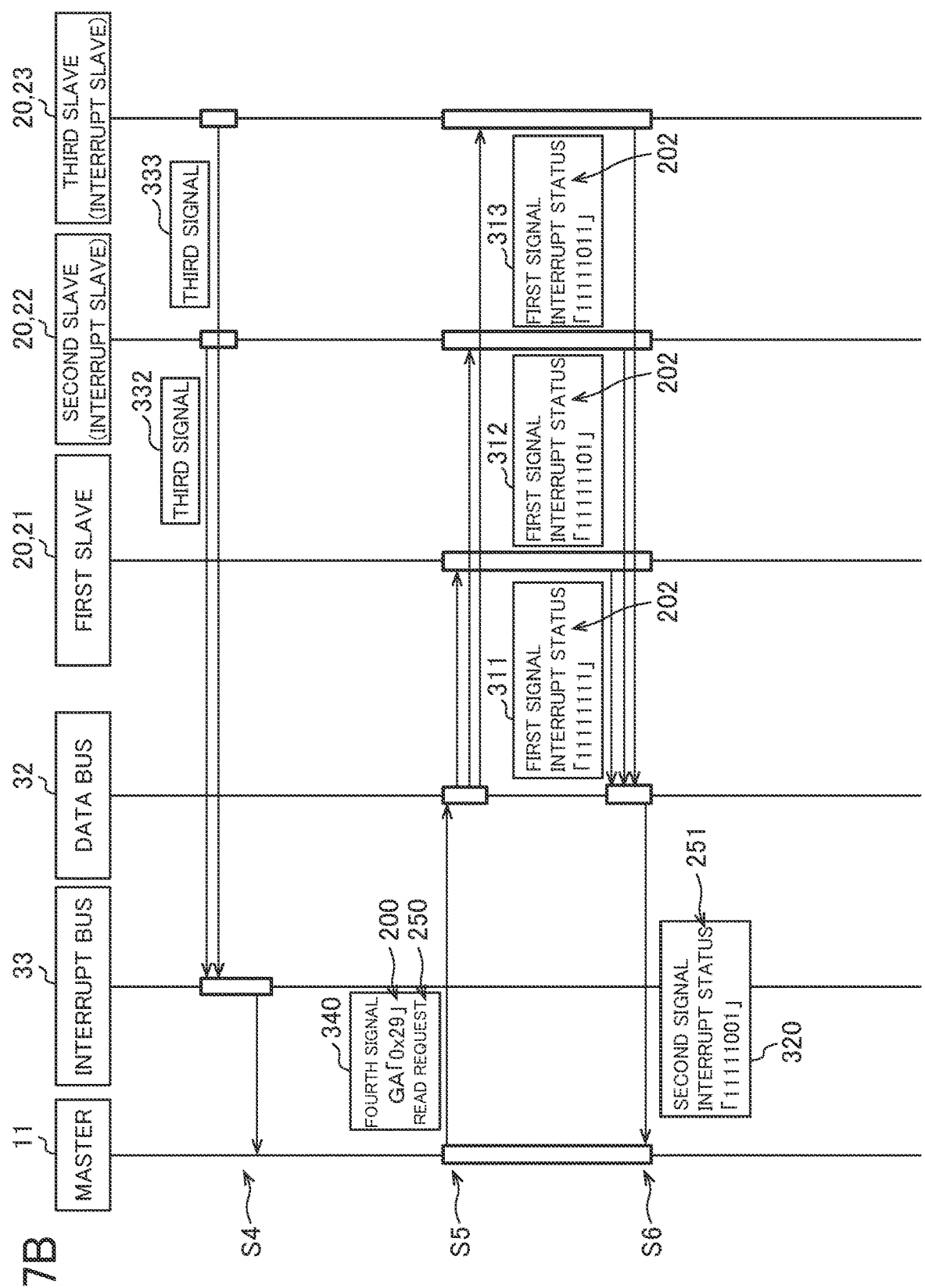
FIG. 7B is a sequence diagram representing a flow of communications performed between a master and a plurality of slaves included in the electronic device in accordance with Embodiment 1.

FIGS. 7A to 7C are sequence diagrams representing a flow of communications performed between a master and a plurality of slaves included in the electronic device in accordance with Embodiment 1.

Referring to FIG. 7A, in step S1, the master 11 transmits a seventh signal 371 from the first data terminal 11b. The transmitted seventh signal 371 represents the MSA 201 (MSA "0x40") to be assigned to the first slave 21. The data bus 32 transfers the transmitted seventh signal 371 from the first data terminal 11b to the second data terminal 21b. The first slave 21 receives the transferred seventh signal 371 at the second data terminal 21b. Hence, the master 11 transmits, to the first slave 21, the seventh signal 371 representing MSA "0x40" to be assigned to the first slave 21. The first slave 21 specifies MSA "0x40" represented by the received seventh signal 371 as the MSA for the first slave 21.

In subsequent step S2, the master 11 transmits a seventh signal 372 from the first data terminal 11b. The transmitted seventh signal 372 represents the MSA 201 (MSA "0x41") to be assigned to the second slave 22. The data bus 32 transfers the transmitted seventh signal 372 from the first data terminal 11b to the second data terminal 22b. The second slave 22 receives the transferred seventh signal 372 at the second data terminal 22b. Hence, the master 11 transmits, to the second slave 22, the seventh signal 372 representing MSA "0x41" to be assigned to the second slave 22. The second slave 22 specifies MSA "0x41" represented by the received seventh signal 372 as the MSA for the second slave 22.

In subsequent step S3, the master 11 transmits a seventh signal 373 from the first data terminal 11b. The transmitted seventh signal 373 represents the MSA 201 (MSA "0x42") to be assigned to the third slave 23. The data bus 32 transfers the transmitted seventh signal 373 from the first data terminal 11b to the second data terminal 23b. The third slave 23 receives the transferred seventh signal 373 at the second data terminal 23b. Hence, the master 11 transmits, to the third slave 23, the seventh signal 373 representing MSA "0x42" to be assigned to the third slave 23. The third slave 23 specifies MSA "0x42" represented by the received seventh signal 373 as the MSA for the third slave 23.

The MSA may be assigned in steps S1 to S3 by any method. For example, the MSA may be assigned by a daisy-chain technique, an Enable (En) technique, or a Fuse_trim technique. Among these techniques, an example in which the MSA is assigned by a daisy-chain technique will be described later.

Referring to FIG. 7B, in subsequent step S4, among the slaves 21, 22, and 23, the second slave 22 and the third slave 23, which are interrupt slaves in which an interrupt is occurring, transmit third signals 332 and 333 from the second interrupt terminals 22c and 23c respectively. The transmitted third signals 332 and 333 are interrupt signals representing that an interrupt is occurring in the second slave 22 and the third slave 23 respectively. The interrupt bus 33 transfers the transmitted third signals 332 and 333 from the second interrupt terminals 22c and 23c to the first interrupt terminal 11c respectively. The master 11 receives the transferred third signals 332 and 333 at the first interrupt terminal 11c. Hence, the second slave 22 and the third slave 23 transmit the third signals 332 and 333 to the master 11 respectively. The second interrupt terminals 21c, 22c, and 23c are wired-OR connected to the interrupt bus 33. Therefore, when an interrupt is occurring in any of the slaves 21, 22, and 23, potential Lis provided to the first interrupt terminal 11c, the second interrupt terminals 21c, 22c, and 23c, and the interrupt bus 33, irrespective of in which slave an interrupt is occurring. Therefore, upon receiving an interrupt signal, the master 11 can determine that an interrupt is occurring in one of the slaves 21, 22, and 23, but cannot determine in which of these slaves an interrupt is occurring.

In subsequent step S5, the master 11 transmits a fourth signal 340 from the first data terminal 11b in response to reception of the third signals 332 and 333. The transmitted fourth signal 340 represents a GA200 (GA "0x29") and a read request 250. The data bus 32 transfers the fourth signal 340 from the first data terminal 11b to the second data terminals 21b, 22b, and 23b. Hence, the master 11 transmits the fourth signal 340 to the slaves 21, 22, and 23 in response to reception of the third signals 332 and 333.

In subsequent step S6, the slaves 21, 22, and 23 transmit first signals 311, 312 and 313 from the second data terminals 21b, 22b, and 23b respectively in response to reception of the fourth signal 340. The transmitted first signals 311, 312 and 313 represent the interrupt statuses 202 obtained by the slaves 21, 22, and 23 (interrupt statuses "11111111," "11111101," and "11111011") respectively.

The slaves 21, 22, and 23 simultaneously transmit the first signals 311, 312 and 313. The data bus 32 wired-ORs the second data terminals 21b, 22b, and 23b. Therefore, the data bus 32 generates a second signal 320 by superimposing the plurality of simultaneously transmitted first signals 311, 312 and 313 and transfers the generated second signal 320 to the first data terminal 11b. The master 11 receives the transferred second signal 320 at the first data terminal 11b. The value of an i-th bit of a superimposed interrupt status 251 (superimposed interrupt status "11111001") represented by the second signal 320 is the result of logical disjunction the values of the i-th bits of the interrupt statuses 202 represented by the first signals 311, 312 and 313 (interrupt statuses "11111111," "11111101," and "11111011") respectively. For example, the value "0" of the seventh bit 227 of superimposed interrupt status "11111001" is the result of logical disjunction "1," "0," and "1," which are the values of the seventh bits of interrupt statuses "11111111," "11111101," and "11111011" represented by the first signals 311, 312 and 313 respectively.

The master 11 ascertains that the second slave 22 and the third slave 23 to which MSA "0x41" and MSA "0x42" associated with the seventh bit 227 and the sixth bit 226 of the superimposed interrupt status 251 (superimposed interrupt status "11111001") that have a "0" value representing that an interrupt is occurring are assigned are the interrupt slaves in which an interrupt is occurring. Hence, the master 11 identifies the interrupt slave in which an interrupt is occurring, on the basis of the second signal 320. The master 11 can identify the interrupt slave simply by receiving the second signal 320 once. Hence, the interrupt slave can be quickly identified.

Referring to FIG. 7C, in subsequent step S7, the master 11 transmits a fifth signal 352 from the first data terminal 11b. The transmitted fifth signal 352 represents a measurement read request 252 and the MSA 201 (MSA "0x41") assigned to the second slave 22 ascertained to be the interrupt slave in which an interrupt is occurring. The data bus 32 transfers the transmitted fifth signal 352 from the first data terminal 11b to the second data terminals 21b, 22b, and 23b. Hence, the master 11 transmits the fifth signal 352 to the slaves 21, 22, and 23.

In subsequent step S8, each slave 20 receives the transferred fifth signal 352 at the second data terminal 20b, and if the MSA 201 (MSA "0x41") represented by the received fifth signal 352 matches the MSA assigned to the slave 20, transmits a sixth signal 362 from the second data terminal 20b. Each slave 20 does not transmit the sixth signal 362 if MSA "0x41" represented by the received fifth signal 352 does not match the MSA for the slave 20. Hence, the second slave 22, which is ascertained to be the interrupt slave that has MSA "0x41" that matches MSA "0x41" represented by the fifth signal 352 and in which an interrupt is occurring, receives the fifth signal 352 at the second data terminal 22b. The second slave 22 transmits the sixth signal 362 from the second data terminal 22b in response to reception of the fifth signal 352. The transmitted sixth signal 362 represents a measurement 262 acquired by measurement by the second slave 22. The data bus 32 transfers the transmitted sixth signal 362 from the second data terminal 22b to the first data terminal 11b. The master 11 receives the transferred sixth signal 362 at the first data terminal 11b. Hence, the second slave 22 transmits the sixth signal 362 to the master 11 in response to reception of the transmitted fifth signal 352. The master 11 receives the transmitted sixth signal 362 at the first data terminal 11b. Hence, the master 11 can acquire the measurement 262 acquired by the second slave 22.

In subsequent step S9, the master 11 transmits a fifth signal 353 from the first data terminal 11b. The transmitted fifth signal 353 represents the measurement read request 252 and the MSA 201 (MSA "0x42") assigned to the third slave 23 ascertained to be the interrupt slave in which an interrupt is occurring. The data bus 32 transfers the transmitted fifth signal 353 from the first data terminal 11b to the second data terminals 21b, 22b, and 23b. Hence, the master 11 transmits the fifth signal 353 to the slaves 21, 22, and 23.

In subsequent step S10, each slave 20 receives the transferred fifth signal 353 at the second data terminal 20b, and if the MSA 201 (MSA "0x42") represented by the received fifth signal 353 matches the MSA assigned to the slave 20, transmits a sixth signal 363 from the second data terminal 20b. Each slave 20 does not transmit the sixth signal 363 if MSA "0x42" represented by the received fifth signal 353 does not match the MSA for the slave 20. Hence, the third slave 23, which is ascertained to be the interrupt slave that has MSA "0x42" that matches MSA "0x42" represented by the fifth signal 353 and in which an interrupt is occurring, receives the fifth signal 353 at the second data terminal 23b and transmits the sixth signal 363 from the second data terminal 23b in response to reception of the fifth signal 353. The transmitted sixth signal 363 represents a measurement 263 acquired by measurement by the third slave 23. The data bus 32 transfers the transmitted sixth signal 363 from the second data terminal 23b to the first data terminal 11b. The master 11 receives the transferred sixth signal 363 at the first data terminal 11b. Hence, the third slave 23 transmits the sixth signal 363 to the master 11 in response to reception of the transmitted fifth signal 353. The master 11 receives the transmitted sixth signal 363 at the first data terminal 11b. Hence, the master 11 can acquire the measurement 263 acquired by the third slave 23.

Figure 8:
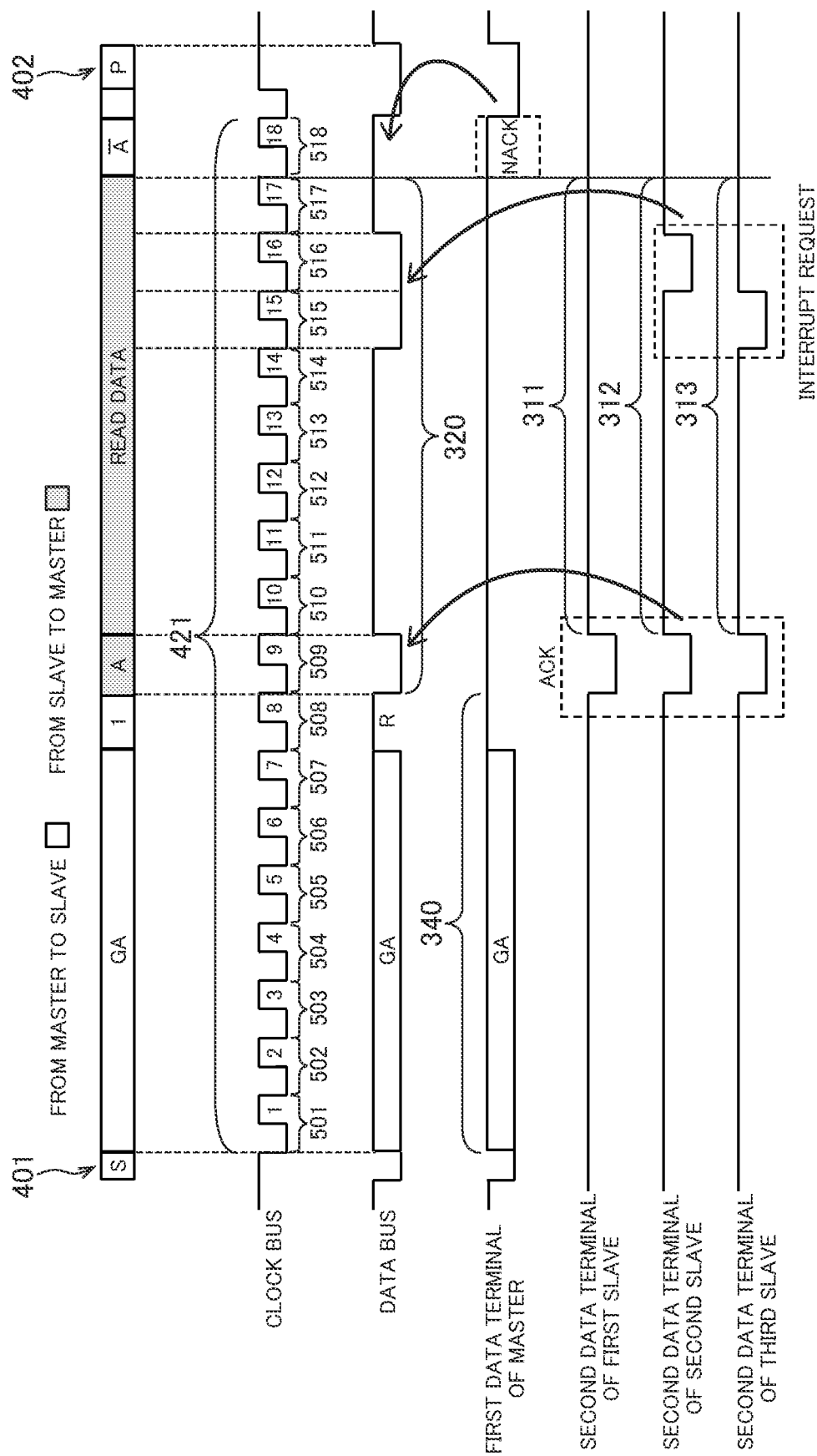
FIG. 8 is a timing chart representing the waveforms of electrical potentials provided to a clock bus, a data bus, a first data terminal, and a second data terminal included in the electronic device in accordance with Embodiment 1.

1.9 Waveforms of Electrical Potentials Provided to Clock Bus, Data Bus, First Data Terminal, and Second Data Terminal FIG. 8 is a timing chart representing the waveforms of electrical potentials provided to a clock bus, a data bus, a first data terminal, and a second data terminal included in the electronic device in accordance with Embodiment 1. This timing chart represents the waveforms of electrical potentials in step S5 and S6 shown in FIG. 7B.

Referring to FIG. 8, in start 401, the master 11 provides potential H to the first clock terminal 11a and the clock bus 31. The master 11 provides potential L to the first data terminal 11b and the data bus 32 while providing potential H to the first clock terminal 11a and the clock bus 31. Hence, the master 11 issues a start condition to the slaves 21, 22, and 23. Hence, communication is started between the master 11 and the slaves 21, 22, and 23.

Subsequently, the master 11 alternately provides potential L and potential H repeatedly to the first clock terminal 11a and the clock bus 31. Hence, the master 11 transmits a clock signal 421. The transmitted clock signal 421 contains a first clock pulse 501 through an eighteenth clock pulse 518.

Subsequently, in stop 402, the master 11 provides potential H to the first clock terminal 11a and the clock bus 31. The master 11 provides potential H to the first data terminal 11b and the data bus 32 while providing potential H to the first clock terminal 11a and the clock bus 31. Hence, the master 11 issues a stop condition to the slaves 21, 22, and 23. Hence, communication is stopped between the master 11 and the slaves 21, 22, and 23.

The master 11 provides an electrical potential representing the values of the first bit through the seventh bit contained in the GA200 to the first data terminal 11b and the data bus 32 in synchronism with the first clock pulse 501 through the seventh clock pulse 507 respectively. In addition, the master 11 provides potential H representing the read request 250 (R) to the first data terminal 11b and the data bus 32 in synchronism with the eighth clock pulse 508. Hence, the master 11 transmits the fourth signal 340 representing the GA200 and the read request 250 to the slaves 21, 22, and 23.

When the transmitted fourth signal 340 is received normally, the slaves 21, 22, and 23 provide potential L representing an acknowledge (ACK) to the second data terminals 21b, 22b, and 23b in synchronism with the ninth clock pulse 509 respectively. Hence, the slaves 21, 22, and 23 provide potential L representing an acknowledge to the data bus 32 in synchronism with the ninth clock pulse 509. When the transmitted fourth signal 340 is not received normally, the slaves 21, 22, and 23 provide potential H representing a not acknowledge (NACK) to the second data terminals 21*b*, 22*b*, and 23*b* in synchronism with the ninth clock pulse 509 respectively. Hence, the slaves 21, 22, and 23 provide potential H representing a not acknowledge to the data bus 32 in synchronism with the ninth clock pulse 509. This example assumes that the slaves 21, 22, and 23 have received the fourth signal 340 normally.

The first slave 21 provides an electrical potential representing the values of the first bit 221 through the eighth bit 228 contained in the interrupt status 202 (interrupt status "11111111") to the second data terminal 21*b* and the data bus 32 in synchronism with the tenth clock pulse 510 through the seventeenth clock pulse 517 respectively. The second slave 22 provides an electrical potential representing the values of the first bit 221 through the eighth bit 228 contained in the interrupt status 202 (interrupt status "11111101") to the second data terminal 22*b* and the data bus 32 in synchronism with the tenth clock pulse 510 through the seventeenth clock pulse 517 respectively. The third slave 23 provides an electrical potential representing the values of the first bit 221 through the eighth bit 228 contained in the interrupt status 202 (interrupt status "11111011") to the second data terminal 23*b* and the data bus 32 in synchronism with the tenth clock pulse 510 through the seventeenth clock pulse 517 respectively. Hence, the slaves 21, 22, and 23 transmit the first signals 311, 312 and 313 representing interrupt statuses "11111111," "11111101," and "11111011" respectively to the master 11. Interrupt statuses "11111111," "11111101," and "11111011" are read data that is returned in response to the read request 250. The first slave 21 provides potential H representing that no interrupt is occurring to the second data terminal 21*b* in synchronism with the seventeenth clock pulse 517. The second slave 22 provides potential L representing that an interrupt is occurring to the second data terminal 22*b* in synchronism with the sixteenth clock pulse 516. The third slave 23 provides potential L representing that an interrupt is occurring to the second data terminal 23*b* in synchronism with the fifteenth clock pulse 515. Hence, the slaves 22 and 23 provide potential L representing that an interrupt is occurring to the clock bus 31 in synchronism with the fifteenth clock pulse 515 and the sixteenth clock pulse 516, whereas the slave 21 provides potential H representing that no interrupt is occurring to the clock bus 31 in synchronism with the seventeenth clock pulse 517.

When the transferred second signal 320 is received normally, the master 11 provides potential H representing a not acknowledge (NACK) to the first data terminal 11*b* and the data bus 32 in synchronism with the eighteenth clock pulse 518. Hence, the master 11 does not give the right to control the data bus 32 to each slave 20, restraining each slave 20 from transmitting another signal.

1.10 Assigning Multi-Slave Addresses by Daisy-Chain Technique

Figure 9:
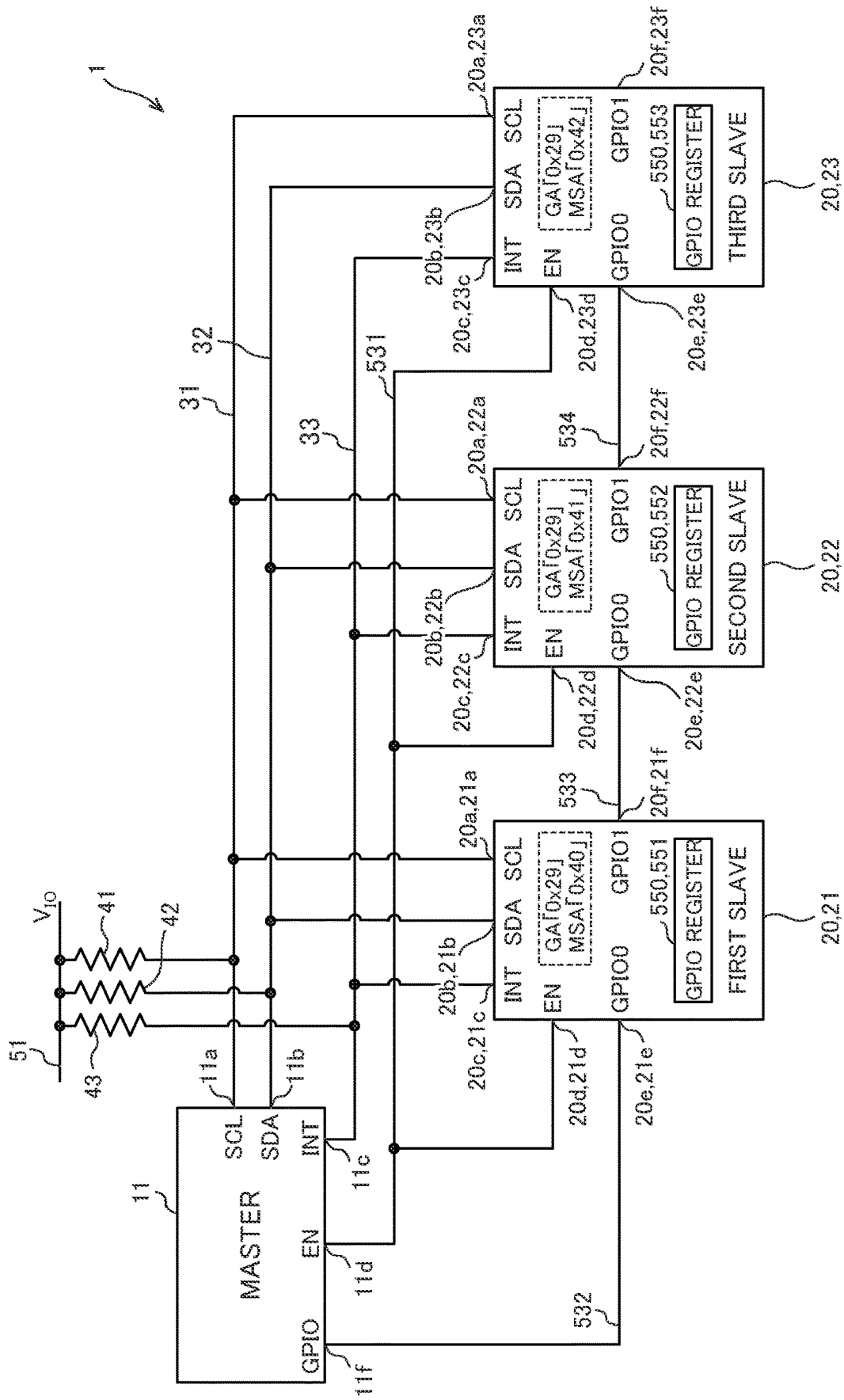
FIG. 9 is a block diagram of the electronic device in accordance with Embodiment 1 when multi-slave addresses are assigned by a daisy-chain technique.

FIG. 9 is a block diagram of the electronic device in accordance with Embodiment 1 when multi-slave addresses are assigned by a daisy-chain technique.

Referring to FIG. 9, when multi-slave addresses are assigned by a daisy-chain technique, the electronic device 1 includes an enable line 531, a first daisy-chain line 532, a second daisy-chain line 533, and a third daisy-chain line 534. The master 11 includes a first enable (EN) terminal 11*d* and a general-purpose input/output (GPIO) terminal 11*f*. The plurality of slaves 21, 22, and 23 include a plurality of general-purpose input/output (GPIO) registers 551, 552, and 553, a plurality of second enable (EN) terminals 21*d*, 22*d*, and 23*d*, a plurality of general-purpose input/output (GPIO0) terminals 21*e*, 22*e*, and 23*e*, and a plurality of general-purpose input/output (GPIO1) terminals 21*f*, 22*f*, and 23*f*, respectively.

The first enable terminal 11*d* and the second enable terminals 21*d*, 22*d*, and 23*d* are electrically connected to the common enable line 531. Hence, the enable line 531 electrically connects the second enable terminals 21*d*, 22*d*, and 23*d* to the first enable terminal 11*d*.

The first daisy-chain line 532 electrically connects the general-purpose input/output terminal 21*e* to the general-purpose input/output terminal 11*f*. The second daisy-chain line 533 electrically connects the general-purpose input/output terminal 22*e* to the general-purpose input/output terminal 21*f*. The third daisy-chain line 534 electrically connects the general-purpose input/output terminal 23*e* to the general-purpose input/output terminal 22*f*. Hence, the first daisy-chain line 532, the second daisy-chain line 533, and the third daisy-chain line 534 daisy-chain the master 11, the first slave 21, the second slave 22, and the third slave 23.

The second enable terminals 21*d*, 22*d*, and 23*d* may be used for inputs. The general-purpose input/output terminals 21*e*, 22*e*, and 23*e* may be used for inputs. The general-purpose input/output terminals 21*f*, 22*f*, and 23*f* may be used for outputs.

When a second enable terminal 20*d* of each slave 20 is provided with potential L, the slave 20 cannot transmit/receive a data signal by using the second clock terminal 20*a* and the second data terminal 20*b* of the slave 20. When the second enable terminal 20*d* is provided with potential H, each slave 20 can transmit/receive a data signal by using the second clock terminal 20*a* and the second data terminal 20*b*.

When potential L is provided to a general-purpose input/output terminal 20*e* of each slave 20, the daisy-chain mode of the slave 20 is disabled. Therefore, each slave 20 is disabled from accepting the assigning of the MSA 201 by using the second clock terminal 20*a* and the second data terminal 20*b*. When the general-purpose input/output terminal 20*e* is provided with potential H, the daisy-chain mode of each slave 20 is enabled. Therefore, each slave 20 is enabled to accept the assigning of the MSA 201 by using the second clock terminal 20*a* and the second data terminal 20*b*.

Each slave 20 provides, to the general-purpose input/output terminal 20*f*, an electrical potential representing the value specified in a general-purpose input/output register 550 of the slave 20.

In the initial state where the MSA 201 is assigned by a daisy-chain technique, the master 11 provides potential L to the first enable terminal 11*d* and the general-purpose input/output terminal 11*f*. In addition, the general-purpose input/output register 550 is set to a value "0." Therefore, each slave 20 provides potential L representing the value "0" to the general-purpose input/output terminal 20*f*. Therefore, potential L is provided to the second enable terminal 20*d* and the general-purpose input/output terminal 20*e*. Therefore, each slave 20 is disabled from transmitting/receiving a data signal by using the second clock terminal 20*a* and the second data terminal 20*b*. In addition, the daisy-chain mode of each slave 20 is disabled. Therefore, each slave 20 is disabled from accepting the assigning of the MSA 201 by using the second clock terminal 20*a* and the second data terminal 20*b*.

Subsequently, the master 11 increases the electrical potential provided to the first enable terminal 11*d* and the general-purpose input/output terminal 11*f* from potential L to potential H. Hence, potential H is provided to the enable line 531 and the second enable terminal 20*d*. In addition, potential H is provided to the first daisy-chain line 532 and the general-purpose input/output terminal 21*e*. Hence, the first slave 21 is enabled to transmit/receive a data signal by using the second clock terminal 21a and the second data terminal 21b. In addition, the daisy-chain mode of the first slave 21 is enabled. Therefore, the first slave 21 is enabled to accept the assigning of the MSA 201 by using the second clock terminal 21a and the second data terminal 21b.

Subsequently, the master 11 transmits, to the first slave 21, the seventh signal 371 representing the GA200 (GA "0x29") and the MSA 201 (MSA "0x40") to be assigned to the first slave 21.

Subsequently, the first slave 21 receives the seventh signal 371 representing the transmitted MSA 201 (MSA "0x40") at the second data terminal 21b which is now enabled for use in the transmission/reception of a data signal. The first slave 21 specifies MSA "0x40" represented by the received seventh signal 371 as the MSA for the first slave 21.

Subsequently, the master 11 decreases the electrical potential provided to the general-purpose input/output terminal 11f from potential H to potential L. Hence, potential L is provided to the first daisy-chain line 532 and the general-purpose input/output terminal 21e. Hence, the daisy-chain mode of the first slave 21 is disabled. Therefore, the first slave 21 is disabled from accepting the assigning of the MSA 201 by using the second clock terminal 21a and the second data terminal 21b.

Subsequently, the first slave 21 specifies the value "1" in the general-purpose input/output register 551. Hence, the first slave 21 provides potential H representing the value "1" specified in the general-purpose input/output register 551 to the general-purpose input/output terminal 21f. Hence, potential H is provided to the second daisy-chain line 533 and the general-purpose input/output terminal 22e. Hence, the daisy-chain mode of the second slave 22 is enabled. Therefore, the second slave 22 is enabled to accept the assigning of the MSA 201 by using the second clock terminal 22a and the second data terminal 22b.

Subsequently, the master 11 transmits, to the second slave 22, the seventh signal 372 representing the GA200 (GA "0x29") and the MSA 201 (MSA "0x41") to be assigned to the second slave 22.

Subsequently, the second slave 22 receives the seventh signal 372 representing the transmitted MSA 201 (MSA "0x41") at the second data terminal 22b which is now enabled for use in the transmission/reception of a data signal. The second slave 22 specifies MSA "0x41" represented by the received seventh signal 372 as the MSA for the second slave 22.

Subsequently, the second slave 22 specifies the value "1" in the general-purpose input/output register 552. Hence, the second slave 22 provides potential H representing the value "1" specified in the general-purpose input/output register 552 to the general-purpose input/output terminal 22f. Hence, potential H is provided to the third daisy-chain line 534 and the general-purpose input/output terminal 23e. Hence, the daisy-chain mode of the third slave 23 is enabled. Therefore, the third slave 23 is enabled to accept the assigning of the MSA 201 by using the second clock terminal 23a and the second data terminal 23b.

Subsequently, the master 11 transmits, to the third slave 23, the seventh signal 373 representing the GA200 (GA "0x29") and the MSA 201 (MSA "0x42") to be assigned to the third slave 23.

Subsequently, the third slave 23 receives the seventh signal 373 representing the transmitted MSA 201 (MSA "0x42") at the second data terminal 23b which is now enabled for use in the transmission/reception of a data signal. The third slave 23 specifies MSA "0x42" represented by the received seventh signal 373 as the MSA for the third slave 23.

Hence, the assigning of the MSAs 201 (MSA "0x40," MSA "0x41," and MSA "0x42") to the first slave 21, the second slave 22, and the third slave 23 is completed.

The present disclosure is not limited to the description of the embodiments and examples above. Any structure detailed in the embodiments and examples may be replaced by a practically identical structure, a structure that delivers practically the same effect and function, or a structure that achieves practically the same purpose.

What is claimed is:

1. An electronic device comprising:
   a master; and
   a plurality of slaves to which a plurality of mutually different identifiers is, respectively, assigned, wherein each slave of the plurality of slaves:
   transmits, to the master, a first signal representing a bit sequence that contains a bit representing whether an interrupt is occurring in the slave, and changes a position of the bit based on an identifier, among the plurality of mutually different identifiers, assigned to the slave, and
   has a register configured to output the first signal, and causes the master to identify the slave, as one of the plurality of slaves in which the interrupt is occurring, by changing the position of the bit in the bit sequence of the first signal that is output from the register.

2. The electronic device according to claim 1, wherein the master includes a first data terminal,
   the plurality of slaves includes, respectively, a plurality of second data terminals,
   the electronic device further comprises a data bus that wired-OR connects the plurality of second data terminals to each other to electrically connect the plurality of second data terminals to the first data terminal,
   each slave of the plurality of slaves transmits the first signal from one of the plurality of second data terminals that is included in the slave,
   the plurality of slaves simultaneously transmits, respectively, the plurality of first signals transmitted by the plurality of slaves,
   the data bus generates a second signal by superimposing the plurality of first signals, and transfers the second signal to the first data terminal, and
   the master receives the second signal at the first data terminal.

3. The electronic device according to claim 1, wherein the identifier contains a plurality of bits, and
   each slave of the plurality of slaves changes the position based on at least one of the plurality of bits.

4. An electronic device comprising:
   a master; and
   a plurality of slaves to which a plurality of mutually different identifiers is respectively assigned, wherein
   each slave of the plurality of slaves transmits, to the master, a first signal representing a bit sequence that contains a bit representing whether an interrupt is occurring in the slave, and changes a position of the bit based on an identifier, among the plurality of mutually different identifiers, assigned to the slave,
   an interrupt slave that is one of the plurality of slaves and in which the interrupt is occurring transmits a third signal to the master,
   the master transmits a fourth signal to the plurality of slaves in response to a reception of the third signal, and each slave of the plurality of slaves transmits the first signal in response to a reception of the fourth signal.

5. The electronic device according to claim 4, wherein the plurality of slaves has a common address, and the fourth signal represents the common address.

6. The electronic device according to claim 4, wherein the master includes a first data terminal and a first interrupt terminal, the plurality of slaves includes, respectively a plurality of second data terminals and a plurality of second interrupt terminals, the electronic device further comprising:
  a data bus that wired-OR connects the plurality of second data terminals to each other to electrically connect the plurality of second data terminals to the first data terminal; and
  an interrupt bus that wired-OR connects the plurality of second interrupt terminals to each other to electrically connect the plurality of second interrupt terminals to the first interrupt terminal, wherein the interrupt slave transmits the third signal from one of the plurality of second interrupt terminals that is included in the interrupt slave, the interrupt bus transfers the third signal from one of the plurality of second interrupt terminals that is included in the interrupt slave to the first interrupt terminal, the master receives the third signal at the first interrupt terminal and transmits the fourth signal from the first data terminal in response to the reception of the third signal, the data bus transfers the fourth signal from the first data terminal to the plurality of second data terminals, the plurality of slaves receives, respectively, the fourth signal at the plurality of second data terminals, and each slave of the plurality of slaves transmits the first signal from one of the plurality of second data terminals that is included in the slave in response to the reception of the fourth signal.

7. An electronic device comprising:
a master; and
a plurality of slaves to which a plurality of mutually different identifiers is, respectively, assigned, wherein each slave of the plurality of slaves transmits, to the master, a first signal representing a bit sequence that contains a bit representing whether an interrupt is occurring in the slave, and changes a position of the bit based on an identifier, among the plurality of mutually different identifiers, assigned to the slave, the master identifies an interrupt slave, being one of the plurality of slaves in which the interrupt is occurring, based on a second signal generated by superimposing a plurality of first signals transmitted, respectively, by the plurality of slaves, and transmits a fifth signal to the plurality of slaves, the interrupt slave transmits a sixth signal to the master in response to a reception of the fifth signal, and the master receives the sixth signal.

8. The electronic device according to claim 7, wherein the fifth signal represents the identifier assigned to the interrupt slave, and each slave of the plurality of slaves transmits the sixth signal to the master when the identifier represented by the fifth signal matches the identifier assigned to the slave and does not transmit the sixth signal to the master when the identifier represented by the fifth signal does not match the identifier assigned to the slave.

9. The electronic device according to claim 8, wherein the master includes a first data terminal, the plurality of slaves includes, respectively, a plurality of second data terminals, the electronic device further comprising a data bus that wired-OR connects the plurality of second data terminals to each other to electrically connect the plurality of second data terminals to the first data terminal, wherein the master transmits the fifth signal from the first data terminal, the data bus transfers the fifth signal from the first data terminal to the plurality of second data terminals, the interrupt slave receives the fifth signal at one of the plurality of second data terminals that is included in the interrupt slave and transmits the sixth signal from the one of the plurality of second data terminals in response to the reception of the fifth signal, the data bus transfers the sixth signal from the one of the plurality of second data terminals to the first data terminal, and the master receives the sixth signal at the first data terminal.

10. The electronic device according to claim 7, wherein each slave of the plurality of slaves is a device that operates in serial communications and outputs an interrupt signal for completion of an operation.

11. The electronic device according to claim 8, wherein each slave of the plurality of slaves is a device that operates in serial communications and outputs an interrupt signal for completion of an operation.

12. The electronic device according to claim 9, wherein each slave of the plurality of slaves is a device that operates in serial communications and outputs an interrupt signal for completion of an operation.

* * * * *